Patented May 15, 1945

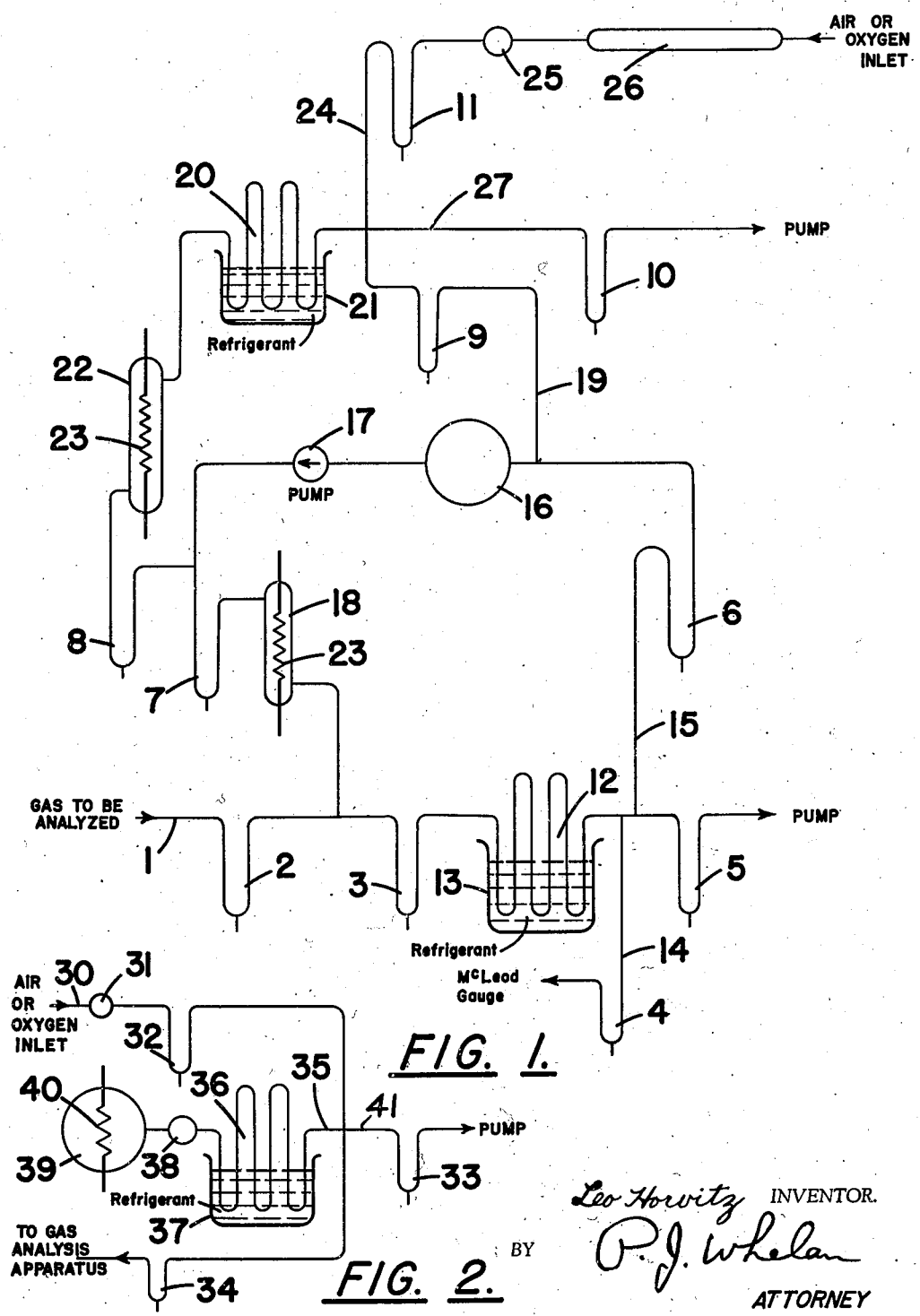

2,376,145

UNITED STATES PATENT OFFICE 2,376,145

GAS ANALYSIS

Leo Horvitz, Houston, Tex.

Application March 28, 1941, Serial No. 385,592

1 Claim. (Cl. 23—254)

The present invention is directed to a method for analyzing gas for small quantities of combustible material.

More particularly, the present invention is directed to that method of geochemical prospecting in which soil gases are collected and analyzed for their content of combustible material such as hydrocarbons and hydrogen which are present in minute traces in these gases.

As has already been indicated, in that method of geochemical prospecting in which soil gases are analyzed for their content of hydrocarbons and/or hydrogen, these constituents are found in extremely minute amounts, ranging from a few parts per million to several hundred parts per million by volume. In one particular method soil samples are collected and a gas sample is collected from the soil by desorption, this gas being then analyzed for its content of hydrocarbon and/or hydrogen. In this case the significant constituents, be it hydrocarbon or hydrogen, is expressed in parts per billion by weight of the soil sample and may vary from a few parts per billion to several hundred parts per billion. As will be understood, the analytical method employed for this purpose must be extremely sensitive. It should be capable of measuring hydrocarbons present in a gas at least as accurately as to a few parts per million by volume.

It has been found that in analyses of this type errors may creep into the results by reason of impurities in the air or oxygen used for the combustion of the combustible constituents which are being analyzed for. Where hydrocarbons are being sought and air is employed to support the combustion, it may be that the air will contain combustible matter, such as hydrocarbons, carbon monoxide or hydrogen, which will influence the results of the analysis, which, as will be understood, are measured in terms of carbon dioxide and water produced by the combustion of the significant constituent. Even when pure oxygen is employed, difficulty is encountered when the analysis is conducted by reason of the fact that most of this pure oxygen is obtained electrolytically, and is frequently contaminated with minute amounts of hydrogen.

To illustrate the difficulty more specifically, a prospect was run by the method in which soil gas is analyzed for hydrogen, and high values of hydrogen were found. The combustion-supporting gas employed in this case was purchased as pure oxygen. The hydrogen content of the soil gas was so great that the oxygen itself was examined and found to contain large amounts of hydrogen which, upon inquiry as to the method employed for the manufacture of the oxygen, was found to be hydrogen resulting from the electrolysis of water. Again, in many cases in which air is employed for the analysis of gaseous hydrocarbons, it has been found that room air in a laboratory contains hydrocarbon gases which leak into the atmosphere from the gas jets in such places.

According to the present invention, therefore, the combustion-supporting gas used for the analyses of gases containing minute amounts of combustible material is first subjected to a treatment capable of removing from it any combustible material that may be contained therein. In many instances sufficient purification can be realized by subjecting the combustion-supporting gas to very low temperatures, such as the temperature of liquid nitrogen or liquid air, or liquid hydrogen. Liquid hydrogen is expensive and liquid nitrogen and liquid air do not produce a low enough temperature to insure the complete removal of substances such as methane, carbon monoxide and hydrogen, and for this reason it is desirable, and in fact preferable, to combine, with the refrigerating step, a combustion step. That is to say, the air or oxygen to be used for combustion, is itself first subjected to combustion and to refrigeration, at least after the combustion.

In a practical operation according to the present invention the air or oxygen to be used for the combustion of the gas to be analyzed is first passed through a trap refrigerated by liquid nitrogen in which any condensible constituents will be removed. The residual air or oxygen is then conducted to a combustion chamber where it is subjected to combustion, and is then again subjected to refrigeration to remove any products of combustion, namely, carbon dioxide and water. The gas is then sufficiently pure to be admitted to the combustion zone in which the gas to be analyzed is burned. It will be understood, of course, that both in the initial and in the final refrigeration steps any carbon dioxide and water contained in the combustion supporting gas is removed. It is sometimes desirable to pass the gas through a dehydrating agent before introducing it into the purification system so that the possibility of any water collecting on the walls of the conduit and being later picked up by the purified gas before its use in the analytical step is avoided. This initial dehydration step is not necessary in most types of apparatus employed for this purpose because all of the portions of the apparatus with which the purified combustion supporting gas comes into contact, are maintained at any extremely low pressure or conversely, high vacuum, and are intermittently flamed so that collection of water on the walls is prevented.

The present invention will be more clearly understood from the following detailed description of the accompanying drawing in which Fig. 1 is a front elevation in diagrammatic form of one type of apparatus suitable for the performance of the method of the present invention; and Fig. 2 is a modified form of apparatus useful for this purpose.

The arrangement shown in Fig. 1 is identical in essential features with that shown in Fig. 2 of the drawing of my copending application Ser. No. 183,960, filed January 8, 1938, now U. S. Patent No. 2,287,101, of which the present application is a continuation in part.

Referring particularly to Fig. 1, numeral 1 designates the point of entry of the gas to be analyzed. The system is provided with a plurality of mercury float valves designated by numerals 2, 3, 4, 5, 6, 7, 8, 9, 10 and 11. Line 1 is connected through valves 2 and 3 to a trap 12 which is preferably identical with that described in Patent No. 2,177,139, issued October 24, 1939. This trap 12 is immersed in a suitable refrigerant contained in a receptacle 13. The outlet of the trap is connected through valve 5 to a pump, not shown. Between valve 5 and the outlet of the trap is a branch line 14 which is connected through valve 4 to a McLeod gauge, or other suitable gauge, for measuring pressure in the system.

A line 15, which includes valves 6 and 7, has one of its ends connected between the outlet of trap 12 and the valve 5 and the other of its ends connected to line 1 between valves 2 and 3. Arranged in this line between the valves 6 and 7 is a collection cell 16 and a pump 17 which will usually be a mercury diffusion pump. The direction of flow of the gas through the cycle formed by line 15 and the trap 12 is indicated on the pump by an arrow. Between valve 7 and line 1 there is arranged in line 15 a combustion chamber 18.

A line 19 has its two ends connected to the line 15, one end ahead of the collection cell 16 and the other end between the pump and valve 7. This line 19 includes valves 8 and 9, and also includes a trap 20 similar to trap 12 and adapted to be partially immersed in a refrigerating medium in a receptacle 21, and a combustion chamber 22. It may be noted that each of combustion chambers 18 and 22 is provided with a suitable filament 23 which may be electrically heated to effect the combustion.

A branch line 24 carrying valve 11 is connected to line 19 ahead of trap 20 and is provided with a stopcock 25 and a drying tube 26. The free end of line 24 is open to the atmosphere or to a source of oxygen. A second branch line 27 is connected to line 19 ahead of the trap and includes valve 10 on the outer side of which there is a connection to a pump (not shown).

In the operation of this arrangement the combustion supporting gas, be it air or oxygen, is first prepared for use. This is accomplished by closing valve 6 and 7 and evacuating the system above these valves by the pump to which line 27 is connected, valves 8, 9 and 10 being open for this purpose while valve 11 is closed. When the pressure in this part of the system is sufficiently reduced, as will be indicated by a manometer suitably located, the valve 10 is closed and valve 11 and stopcock 25 are opened. It may be mentioned here that the system is usually evacuated to a pressure of $10^{-5}$ mm. of mercury or less. When valve 11 and stopcock 25 are opened, air or oxygen, as the case may be, is drawn into the system until the pressure in the system rises to 20 or 30 mm. At this point stopcock 25 and valve 11 are closed. It is to be noted that, in entering, the air passes through the drying tube 26 which contains a suitable dehydrating agent, such as calcium chloride. The tube may also contain an alkaline hydroxide to remove any carbon dioxide present in the initial gas.

With valves 10 and 11 closed, valves 8 and 9 are opened, and the gas in this portion of the system is circulated by pump 17, the filament in combustion chamber 22 having been heated. In its repeated passage through the combustion chamber the gas is freed from any combustible constituents. Complete combustion of any such constituents in the gas will ordinarily be effected in a minute or two. During the combustion step, if desired, or immediately thereafter, the receptacle 21 is filled with a refrigerant, such as liquid nitrogen. The gas is continuously circulated through the trap 20 surrounded by this refrigerant with the result that the products of combustion, namely, carbon dioxide and water, are condensed and deposited in the trap 20. Valves 8 and 9 are then closed, valve 10 is opened and the trap and combustion chamber are pumped out. This leaves cell 16 and that portion of line 15 which is between valves 6 and 7 filled with purified combustion supporting gas.

Before the gas to be analyzed is introduced into the system valve 5 is opened and the trap is evacuated by the pump connected to the outer end of valve 5. In this case the pressure is also reduced to $10^{-5}$ mm. of mercury or less. The valve 5 is then closed, valves 2 and 3 are opened and the gas to be analyzed is introduced into this portion of the system. The trap is surrounded by a refrigerant, such as liquid nitrogen which maintains a temperature at which the constituent which is to be analyzed for is condensed and collected. Ordinarily, this constituent will be hydrocarbons heavier than methane. In the event that the analysis is to be conducted for hydrogen alone, it will, of course, be necessary to include further traps in the system to effect a suitable fractionation to isolate the hydrogen-containing fraction in trap 12 as explained in my copending application Serial No. 183,960 now U. S. Patent No. 2,287,101.

With the constituent to be measured condensed and deposited in trap 12, valve 2 is closed, valve 5 is opened and the residual gas in this portion of the system is pumped out. Valves 3 and 5 are then closed and valve 4 opened. Refrigerant is removed from trap 12 resulting in vaporization of the condensed constituents. Pressure is then measured with a McLeod gauge. The refrigerant is again applied to trap 12 and the pressure again measured. From the difference in readings the volume of gas intially present is calculated. Valve 4 is then closed, valves 3, 6 and 7 are opened and the refrigerant is removed from trap 12 allowing the collected constituent to vaporize or gasify. The filament 23 in combustion chamber 18 having been in the meantime heated up, the pump 17 is started and gas circulates in the cycle passing repeatedly through the combustion chamber. After a suitable period is allowed for complete combustion, usually not more than a few minutes, the refrigerant is again applied to the trap 12, while the circulation is continued, and the products of combustion, namely, water and carbon dioxide, are collected in this trap. Valves 6 and 7 are then closed, valve 5 is opened, and residual gas is withdrawn from the system. Valve 5 is then closed again, and valve 3 is closed and valve 4 is opened. The refrigerant is again withdrawn from the trap with the result that the water and carbon dioxide vaporize and give a pressure reading on the McLeod gauge which is a measure of the quantity of these constituents. If desired, after this measurement the trap can be again immersed in a refrigerant maintained at about −80° C. to condense out the water, and the resulting pressure in the system, as indicated by the McLeod gauge, will be that due to carbon dioxide alone. The water can then be determined by difference.

In Fig. 2 is shown only the purification system for the combustion supporting gas. In this case this gas, be it air or oxygen, is introduced into the system through line 30 provided with a stopcock 31 and a mercury seal valve 32. The other mercury seal valves in this system are designated by numerals 33 and 34. Line 30 is connected to the gas analytical apparatus (not shown) through the valve 34. Branch line 35 is connected to line 30 and to one side of a trap 36 adapted to be immersed in a refrigerating medium carried in a receptacle 37. The other end of this trap is connected through a stopcock 38 to a collection receptacle 39 which also serves the purpose of a combustion chamber. To this end, receptacle 39 is provided with a suitable filament 40 which may be heated electrically.

Line 30 is provided with a second branch line 41 which is connected through valve 33 to a pump (not shown). In the preparation of the combustion supporting gas for the analytical step by the use of this apparatus, valves 32 and 34 are closed, valve 33 is open, and the system, including the trap and the collection receptacle, stopcock 38 being open, is evacuated as previously described. After evacuation valve 33 is closed and valve 32 and stopcock 31 are opened, permitting the air or oxygen to enter the system. At this time the trap 36 may be immersed in a suitable refrigerant, such as liquid nitrogen, so as to cause the deposition of condensable impurities, such as carbon dioxide and water and heavy hydrocarbons, if any, in the trap 36, the residual gas being permitted to go into the receptacle 39. When a suitable pressure is obtained in the system, which may be any desired pressure and is usually up to about a half an atmosphere, stopcock 31 and valve 32 are closed. At this point it is usually desirable to close stopcock 38, open valve 33, remove the refrigerant from the trap 36 and again evacuate the portion of the system so opened to the pump.

After or during this pumping-out step, the filament 40 can be heated and any combustible material contained in a receptacle 39 burned. Valve 33 is again closed, stopcock 38 is opened, and valve 34 is opened to permit the introduction of the gas into the analytical system. It is important that, when stopcock 38 is opened this time, the trap 36 be immersed in a refrigerant, such as liquid nitrogen, so that in the passage of the gas from receptacle 39 to the analytical apparatus any products of combustion, namely carbon dioxide and water, contained therein, will be deposited in the trap leaving only purified gas for introduction into the analytical system.

The air purification system shown in Fig. 2 corresponds to that shown in my copending application Ser. No. 382,607, filed March 10, 1941, and entitled Gas analysis. To this extent the present application is a continuation-in-part of Ser. No. 382,607.

It will be apparent that changes in the specific procedure described can be made without departing from the scope of the present invention. The particular temperatures and refrigerants mentioned as well as the particular times of operation will change with different gases and with different types of apparatus.

The nature and objects of the present invention having been thus described and illustrated, what is claimed as new and useful is:

In an apparatus for analyzing gases for their content of combustible constituents present therein in minute amounts, in combination, means for separating and isolating from said gas said combustible constituents, means forming with said first mentioned means a closed circulating system including a gas collection receptacle and a pump, a second circulating system including said gas collection receptacle and said pump, a combustion chamber in said second circulating system, a refrigerating zone in said second circulating system, and means for introducing a combustion-supporting gas into said second circulating system.

LEO HORVITZ.